United States Patent
Pracht et al.

(10) Patent No.: US 8,564,266 B2
(45) Date of Patent: Oct. 22, 2013

(54) DC-TO-DC CONVERTER WITH INDEPENDENT COMPENSATION LOGIC

(75) Inventors: Kelly Jean Pracht, Fort Collins, CO (US); Samuel M. Babb, Fort Collins, CO (US); Vance L. Fredrickson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 417 days.

(21) Appl. No.: 12/994,101

(22) PCT Filed: Apr. 4, 2008

(86) PCT No.: PCT/US2008/059461
§ 371 (c)(1),
(2), (4) Date: Nov. 22, 2010

(87) PCT Pub. No.: WO2009/123644
PCT Pub. Date: Oct. 8, 2009

(65) Prior Publication Data
US 2011/0133713 A1    Jun. 9, 2011

(51) Int. Cl.
*G05F 1/00*    (2006.01)
(52) U.S. Cl.
USPC .......................................... 323/283

(58) Field of Classification Search
USPC .......................................... 323/283
See application file for complete search history.

(56) References Cited

U.S. PATENT DOCUMENTS

| | | | |
|---|---|---|---|
| 5,617,306 A * | 4/1997 | Lai et al. | 323/284 |
| 6,737,841 B2 * | 5/2004 | Wrathall | 323/282 |
| 6,847,201 B2 | 1/2005 | De Vries et al. | |
| 7,301,490 B2 | 11/2007 | Butler | |
| 7,728,569 B1 * | 6/2010 | Le et al. | 323/280 |
| 2006/0176098 A1 * | 8/2006 | Chen et al. | 327/341 |
| 2007/0176575 A1 | 8/2007 | Nawa et al. | |

FOREIGN PATENT DOCUMENTS

JP    10-136382    5/1998

OTHER PUBLICATIONS

Internaional Search Report and Written Opinion, dated Jan. 5, 2009, 12 pages.

* cited by examiner

*Primary Examiner* — Jue Zhang

(57) ABSTRACT

An apparatus comprises a direct current ("DC") to DC converter comprising a first compensation logic and other DC to DC converter logic. The first compensation logic compensates for phase shifts in an output of the DC to DC converter. The first compensation logic is disabled independently of the other DC to DC converter logic based on a first communication sent to the DC to DC converter.

20 Claims, 6 Drawing Sheets

DC-TO-DC CONVERTER WITH INDEPENDENT COMPENSATION LOGIC

BACKGROUND

Direct current ("DC")-to-DC converters ("converters") receive a DC' voltage with a first magnitude as an input and subsequently output a DC voltage with a second, different magnitude. Thus, converters are helpful when only the first voltage magnitude is available, but the second voltage magnitude is needed. Furthermore, converters are often required to receive more than one voltage magnitude as input. Even further, converters are often required to output more than one voltage magnitude as well. As such, refinements of the converter that are possible when the input and output are restricted to one voltage magnitude each, e.g. optimizing the transient response of the converter, are no longer possible.

BRIEF DESCRIPTION OF THE DRAWINGS

For a more complete understanding of the present disclosure, reference is now made to the accompanying drawings and detailed description, wherein like reference numerals represent like parts.

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean an optical, wireless, indirect electrical, or direct electrical connection. Thus, if a first device couples to a second device, that connection may be through a direct electrical connection, through an indirect electrical connection via other devices and connections, through an optical connection, or through a wireless connection. Additionally, the term "system" refers to a collection of two or more hardware components.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

In order to overcome the obstacles detailed above, an apparatus and system are disclosed. A direct current ("DC")-to-DC converter ("converter") with multiple sets of independent compensation logic allows optimization of the transient response for each combination of input and output voltages. Each set of compensation logic is enabled and disabled independently of each other and other logic in the converter. Preferably, switches couple each set of compensation logic to the other logic in the converter, and the switches are opened and closed via communications sent to the converter. Preferably the communications are electrical signals. When a switch is closed, the corresponding compensation logic is electrically coupled to the other converter logic. When the switch is open, the corresponding compensation logic is decoupled from the other converter logic. As such, any, all, or no combinations of sets of compensation logic may be enabled or disabled. A specific configuration of enabled and disabled sets of compensation, logic corresponds to the appropriate compensation for a specific pairing of input and output voltages.

By optimizing the transient response, of the converter, the compensation logic cuts the cost of computing systems, saves limited space on computer boards, and is highly reliable, all due to the reduced output capacitance.

Figure 1:
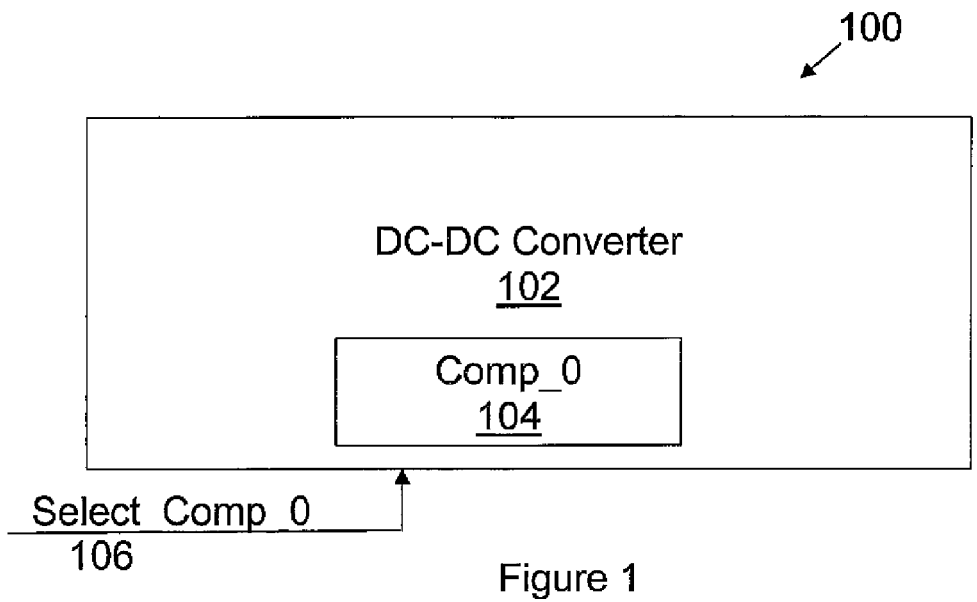
FIG. 1 illustrates a converter with independent compensation logic in accordance with at least some illustrative embodiments.

FIG. 1 illustrates an apparatus 100 comprising a converter 102. The converter 102 is adapted to convert an input DC voltage to an output DC voltage. Preferably, the converter 102 is adapted to convert one or more input voltages into one or more output voltages. The converter 102 comprises compensation logic 104, labeled "Comp_0." The compensation logic 104 is adapted to optimize the transient response of the converter 102. Preferably, the compensation logic 104 is adapted to compensate for phase shifts in an output of the converter 102. Furthermore, the compensation logic 104 is adapted to be disabled and enabled independently of the converter 102 based on communication sent to the converter 102 over a channel 106, labeled "Select_Comp_0." The communication is preferably an electrical signal transmitted over an electrical conductor. In at least one embodiment, the signal is a binary signal indicating that the compensation logic 104 should be enabled or disabled based on a high or low signal respectively. In another embodiment, the compensation logic 104 changes state based on a pulse over the channel 106. For example, if the compensation logic 104 is enabled, a pulse over the channel 106 will disable the compensation logic 104. If the compensation logic 104 is disabled, a pulse over the channel 106 will enable the compensation logic 104. The converter 102 continues to function whether the compensation logic 104 is enabled or disabled. That is, the converter 102 operates to convert an input voltage to an output voltage regardless of whether the compensation logic 104 is enabled or disabled.

Figure 2:
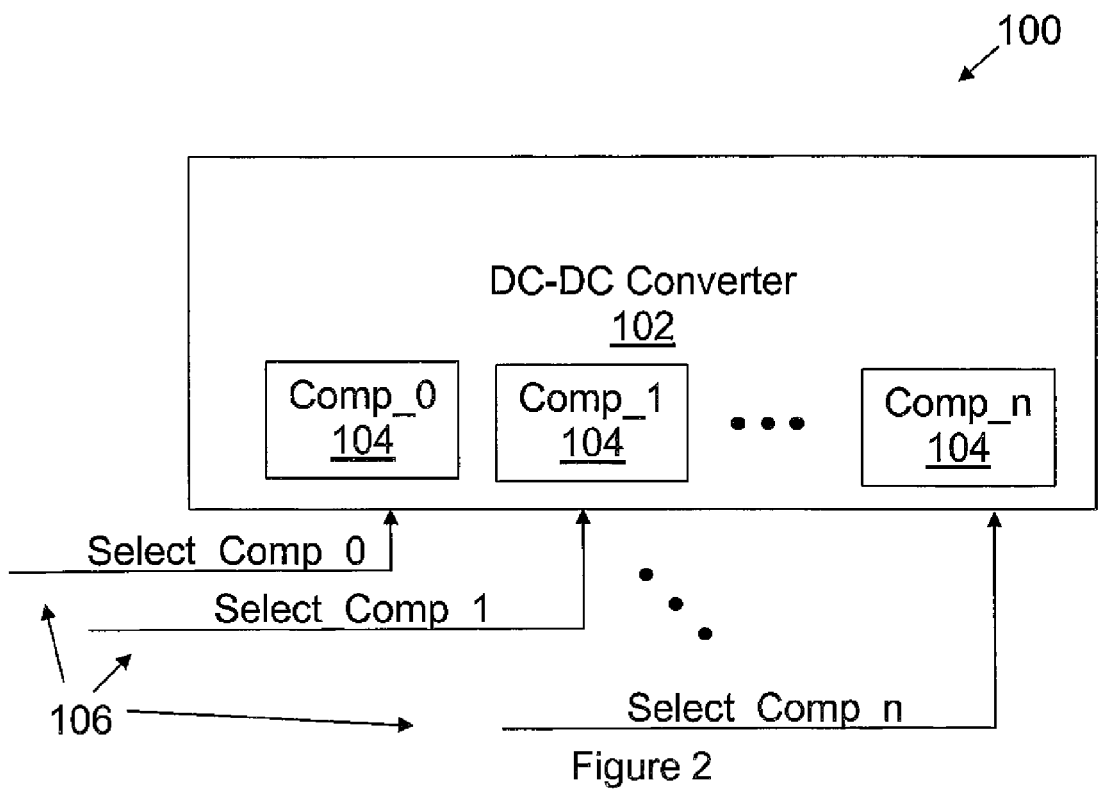
FIG. 2 illustrates a converter with multiple sets of independent compensation logic in accordance with at least some illustrative embodiments.

FIG. 2 illustrates the converter 102 with multiple sets of independent compensation logic 104, labeled "Comp_0,"

"Comp_1," and "Comp_n". Any number of sets of compensation logic 104 may be implemented. Each set of compensation logic 104 may be a single circuit or chip containing any number of elements, or multiple circuits or chips. Each set of compensation logic 104 is adapted to be disabled and enabled independently of the other sets and the converter 102 based on communications sent to the converter 102 over channels 106, labeled "Select_Comp_0," "Select_Comp_1," and "Select_Comp_n." The communications are preferably electrical signals transmitted over wires. In at least one embodiment, each set of compensation logic 104 corresponds to a channel 106. The signals received on each channel 106 are binary signals indicating that the compensation logic 104 corresponding to the particular channel 106 should be enabled or disabled based on a high or low signal respectively. In another embodiment, a set of compensation logic 104 changes state based on a pulse over the channel 106 corresponding to the compensation logic 104. For example, if Comp_1 is enabled, a pulse over Select_Comp_1 will disable Comp_1, and vice versa. The converter 102 continues to function whether all sets, some sets, or no sets of compensation logic 104 are enabled or disabled.

Figure 3:
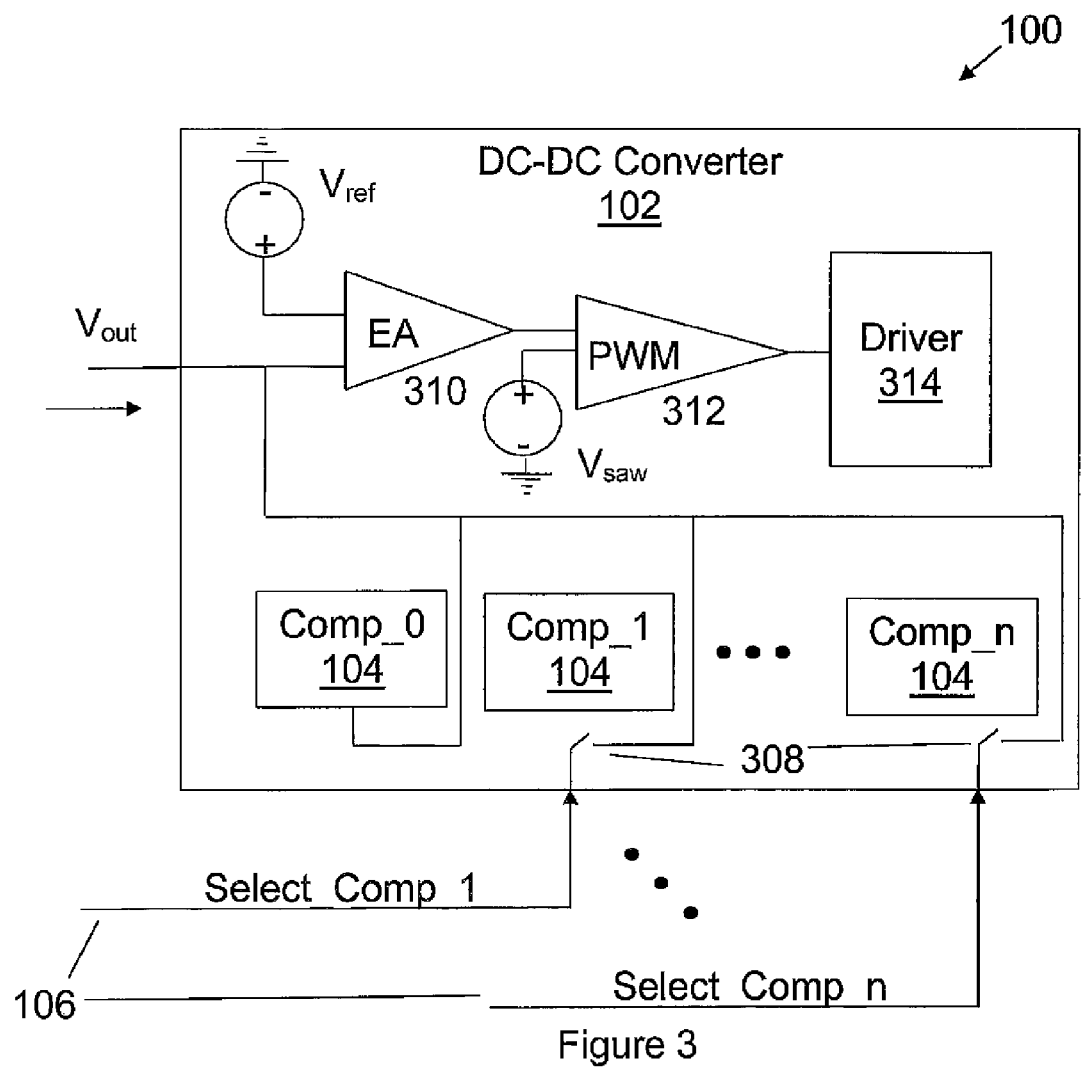
FIG. 3 illustrates a converter with multiple sets of independent compensation logic coupled to other converter logic in accordance with at least some illustrative embodiments.

FIG. 3 illustrates the converter 102 with other converter logic. The other converter logic accepts the output voltage as modified by the compensation logic to use in converting the input voltage. Specifically, such other converter logic comprises an error amplifier (EA) 310, a pulse width modulator (PWM) 312, a driver 314, and voltage sources, labeled "$V_{ref}$" and "$V_{saw}$." In at least one embodiment, each set compensation logic 104 except one, Comp_0, is adapted to be disabled and enabled independently of the other converter logic, other sets of compensation logic, and the converter 102. The disabling and enabling occurs based on communication sent to the converter 102 over channels 106, each channel corresponding to one set of independent compensation logic. As such, Comp_0 is not independent, and does not have a corresponding channel. However, Comp_1 . . . Comp_n are independent, and have corresponding channels labeled "Select_Comp_1" . . . "Select_Comp_n." Preferably, the converter 102 comprises switches 308 adapted to couple and decouple the independent sets of compensation logic 104 from the other converter logic based on the communications.

The error amplifier 310 receives as input the voltage labeled "$V_{out}$" delivered to the load (not shown) connected to the converter 102, as adjusted via the coupling to the sets of compensation logic 104. The error amplifier 310 also receives as input a reference voltage $V_{ref}$. Preferably, $V_{ref}$ indicates the desired output voltage to be delivered to the load. As such, the error amplifier 310 compares the desired output delivered to the load with the actual output delivered to the load, adjusted by the compensation logic, and outputs the difference to the pulse width modulator 312. In at least one embodiment, the error amplifier 310 outputs a multiple of the difference to the pulse width modulator 312.

The pulse width modulator 312 also receives as input a voltage with a sawtooth waveform from voltage source $V_{saw}$. The pulse width modulator 312 compares the output of the error amplifier 310 with $V_{saw}$, and when $V_{saw}$ rises above the output of the error amplifier 310, a logical high is sent to the driver 314. Otherwise, a logical low is sent to the driver 314. The driver 314 is discussed further with respect to FIG. 5.

Figure 4:
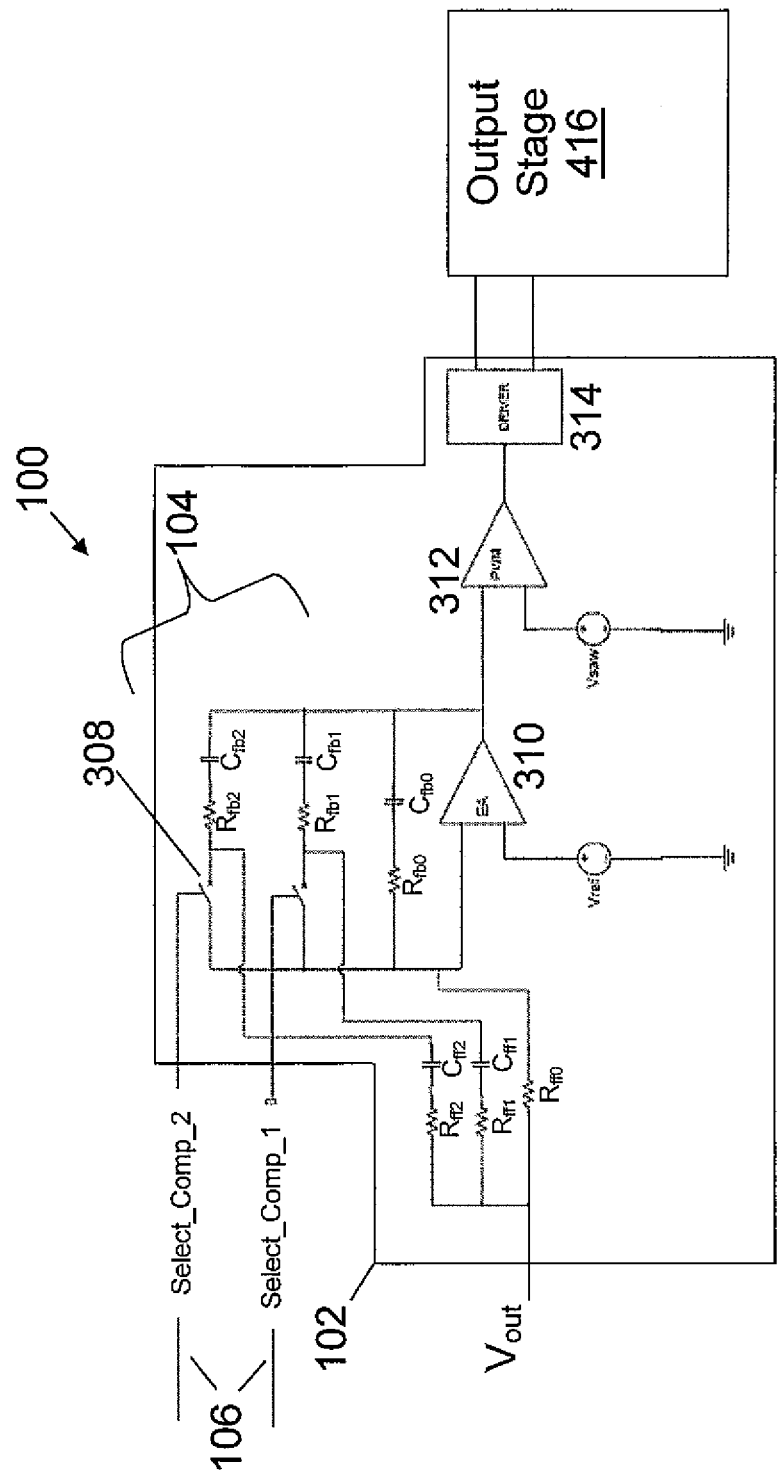
FIG. 4 illustrates a converter, with a specific configuration of independent compensation logic, coupled to an output stage in accordance with at least some illustrative embodiments.

FIG. 4 illustrates the converter 102, with a specific configuration of compensation logic 104, coupled to an output stage 416. The output stage 416 is driven by the converter 102 to provide the output voltage to the load. In at least one embodiment, a set of compensation logic corresponding to channel Select_Comp_1 comprises a resistor, labeled $R_{fb1}$, and a capacitor, labeled $C_{fb1}$. Similarly, a set of compensation logic corresponding to channel Select_Comp_2 comprises $R_{fb2}$ and $C_{fb2}$. Preferably, each resistor and capacitor in a set of compensation logic 104 is coupled in series, and each set of compensation logic 104 is coupled in parallel. In at least one embodiment, the compensation logic 104 is coupled as feedback from the output of the error amplifier 310 to the input of the error amplifier 310. Compensation logic that is not independent need not correspond to a channel. A set of compensation logic that is not independent in FIG. 4 comprises $R_{fb0}$ and $C_{fb0}$. In at least one embodiment, the sets of compensation logic 104 comprise additional logic. As illustrated, the sets of compensation logic 104 further comprise feed forward logic $R_{ff0}$, $R_{ff1}$, $C_{ff1}$, $R_{ff2}$, and $C_{ff2}$ to further modify the input of the error amplifier 310. Preferably, the feed forward resistor and capacitor for each set of compensation logic is coupled in series; and the resistor $R_{ff0}$, corresponding to the dependent compensation logic, is not paired with a capacitor.

Figure 5:
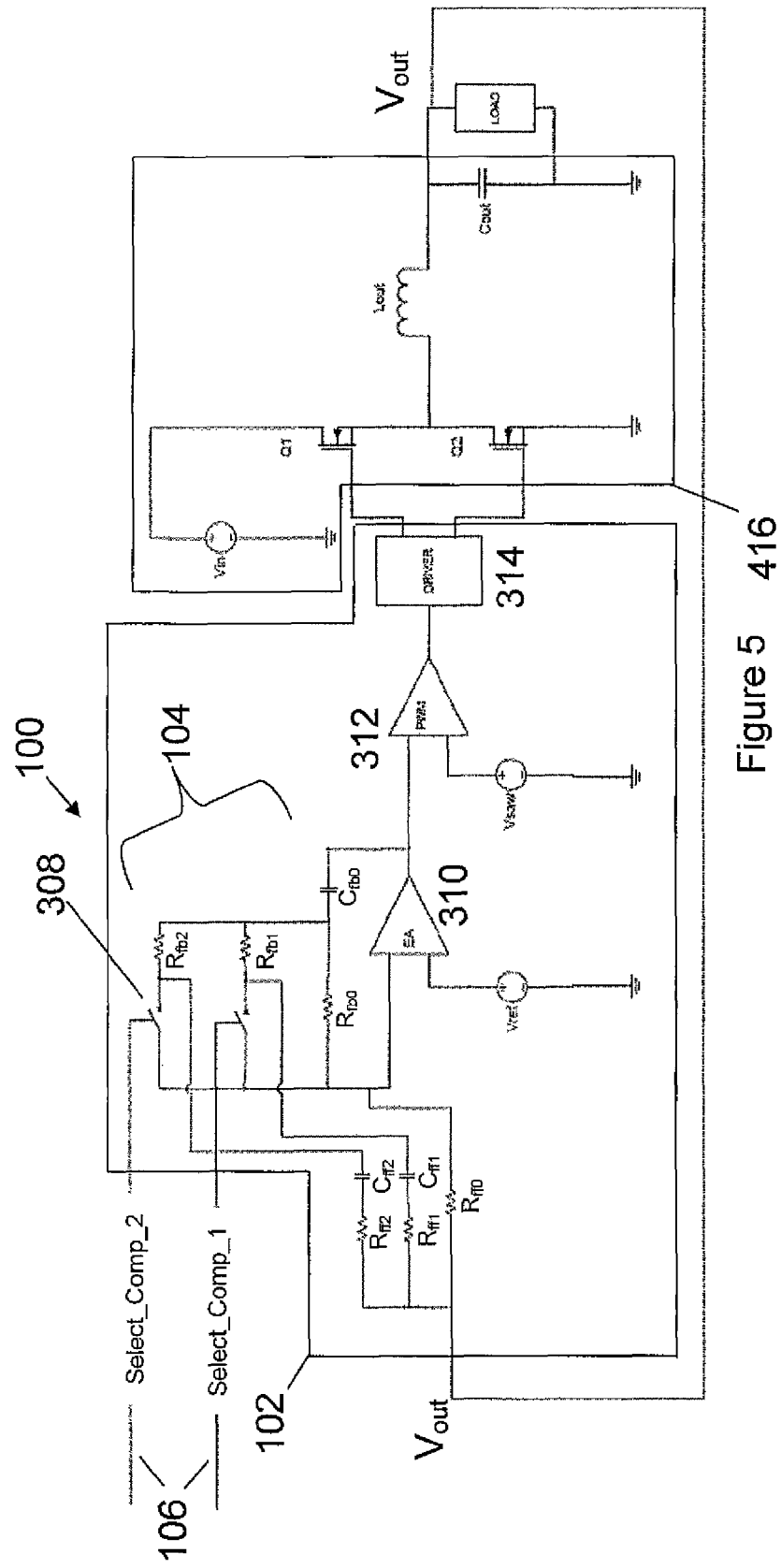
FIG. 5 illustrates a converter, with a specific configuration of independent compensation logic, coupled to a specific configuration of an output stage in accordance with at least some illustrative embodiments.

In at least one embodiment, the driver 314 is coupled to an output stage 416, which is discussed further with respect to FIG. 5. Preferably, an integrated circuit comprises the compensation logic 104 and the other converter logic.

FIG. 5 illustrates the converter 102, with a specific configuration of compensation logic 104, coupled to a specific configuration of an output stage 416. In at least one embodiment, the feedback capacitors in the sets of compensation logic of FIG. 4 are replaced with one feedback capacitor, $C_{fb0}$, in series with each feedback resistor, $R_{fb0}$, $R_{fb1}$, and $R_{fb2}$. The feedback resistors are coupled in parallel with respect to each other. Turning to an example of enabling and disabling of the sets of compensation logic, if the converter 102 is required to convert a first DC voltage to a second DC voltage, the first set of compensation logic (activated via the channel "Select_Comp_1") is enabled, and the second set of compensation logic (activated via the channel "Select_Comp_2) is disabled in order to optimize the transient response for the converter 102 and the specific input/output voltage combination. If the converter 102 is required to convert the first DC voltage to a third DC voltage, the first set of compensation logic is disabled, and the second set of compensation logic is enabled. None of the first DC voltage, the second DC voltage, or the third DC voltage is identical to each other.

The output stage 416 comprises transistors, Q1 and Q2, a voltage source, $V_{in}$, an output inductance, $L_{out}$, and an output capacitance, $C_{out}$. An output voltage, $V_{out}$, is delivered to the load. Preferably Q1 and Q2 are MOSFETs controlled by the driver 314 with the source of Q1 coupled to the drain of Q2, and Vin coupled to the source of Q1. Preferably, the driver 314 controls the voltage and current supplied to the gate of the transistors and minimizes the time the transistors spend in the linear region before saturation.

Figure 6:
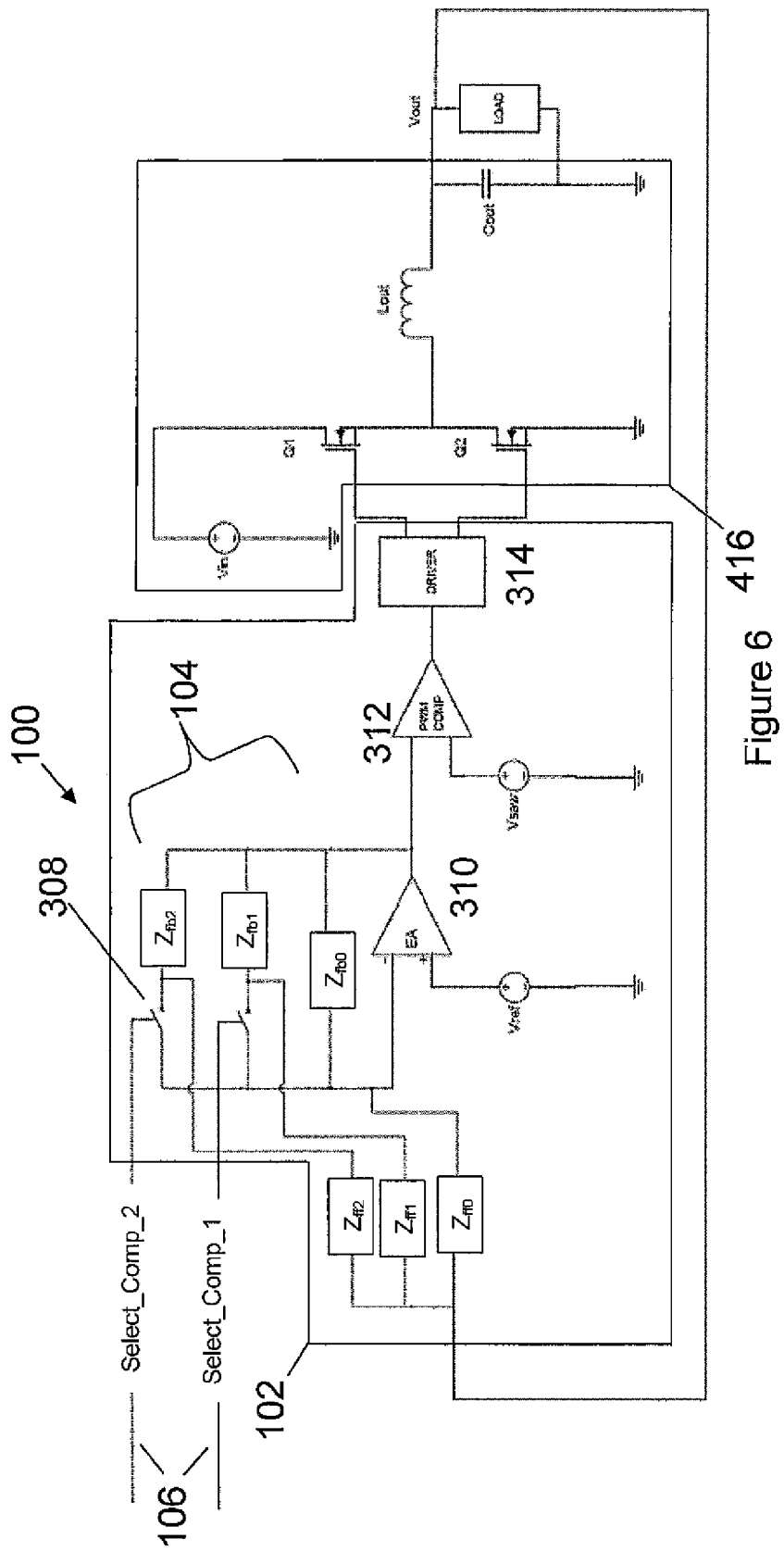
FIG. 6 illustrates a converter, with a general configuration of independent compensation logic, coupled to an output stage in accordance with at least some illustrative embodiments.

FIG. 6 illustrates the converter 102, with a general configuration of compensation logic. The impedance blocks $Z_{fb0}$, $Z_{fb1}$, $Z_{fb2}$, $Z_{ff0}$, $Z_{ff1}$, and $Z_{ff2}$ comprise any type of logic to form the sets of compensation logic. The compensation logic is designed to compensate for phase shifts in the output of the converter 102. Because the converter 102 is designed for multiple output and input voltages, the compensation logic optimizes the transient response for multiple pairs of input and output voltages depending on which sets of compensation logic are enabled and disabled.

For example, when the input voltage is 5V and the output voltage is 1.2V, the first set of compensation logic should be enabled while the second set of compensation logic is disabled in order to optimize the transient response for the converter 102 and the specific input/output voltage combination. Should the output voltage change to 6.6V, the first and second set of compensation logic should be enabled in order to optimize the transient response for the converter. Should the input voltage change to 10V, the first and second set of compensation logic should be disabled in order to optimize the transient response for the converter. In at least one embodiment, the converter is coupled to a computer, and the computer sends the communications to the converter.

Figure 7:
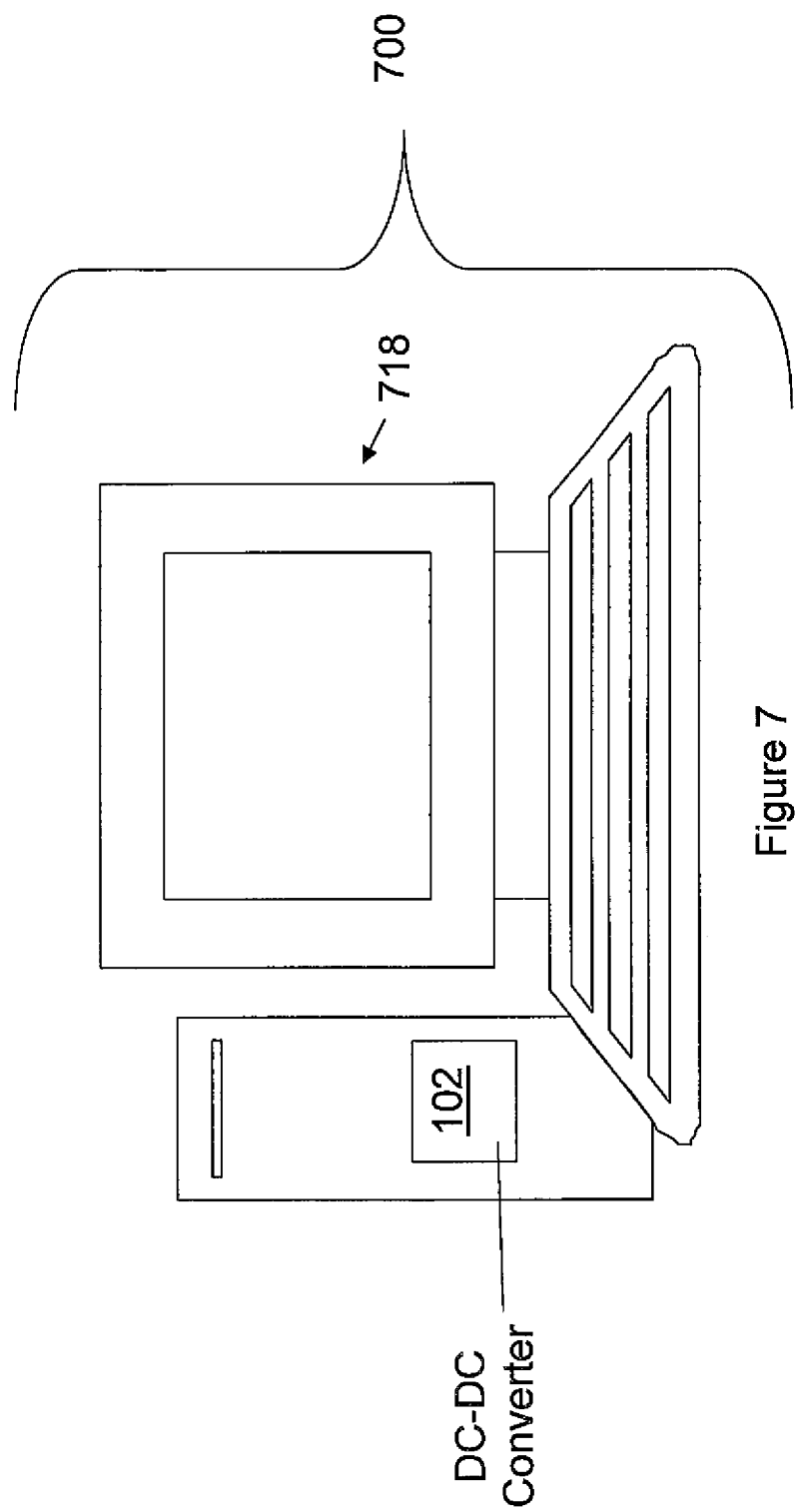
FIG. 7 illustrates a computer containing to a converter with independent compensation logic in accordance with at least some illustrative embodiments.

FIG. 7 illustrates a system 700 comprising the converter 102 coupled to a computer 718. The converter 102 comprises first independent compensation logic (activated by the channel "Select_Comp_1"), second independent compensation logic (activated by the channel "Select_Comp_2"), dependant compensation logic, and other converter logic. The other converter logic comprises an error amplifier 310, a pulse width modulator 312, and a driver 314. The sets of compensation logic 104 are adapted to compensate for phase shifts in an output of the converter 102. Additionally, the sets of independent compensation logic are adapted to be disabled and enabled independently of the sets of the other independent compensation logic, the other converter logic, and the converter 102 based on communications sent to the converter via the channels 106. Preferably, the communications are electrical signals sent over wires, and the computer 718 is adapted to send the communications to the converter 102 based on the converter 102 input and output voltages. The converter 102 further comprises switches 308 adapted to decouple the sets of compensation logic 104 from the other converter logic based on the communications. Preferably, an integrated circuit comprises the sets of compensation logic and the other converter logic.

Turning to an example of enabling and disabling of the sets of compensation logic, if the converter 102 is required to convert a first DC voltage to a second DC voltage, the first set of compensation logic is enabled, and the second set of compensation logic is enabled in order to optimize the transient response for the converter 102 and the specific input/output voltage combination. If the converter 102 is required to convert the first DC voltage to a third DC voltage, the first set of compensation logic is enabled, and the second set of compensation logic is disabled. If the converter 102 is required to convert the first DC voltage to a fourth DC voltage, the first set of compensation logic is disabled, and the second set of compensation logic is enabled. If the converter 102 is required to convert the first DC voltage to a fifth DC voltage, the first set of compensation logic is disabled, and the second set of compensation logic is disabled. None of the first DC voltage, the second DC voltage, the third DC voltage, the fourth DC voltage, or the fifth DC voltage is identical to each other.

Other conditions and combinations of conditions will become apparent to those skilled in the art, including the combination of the conditions described above, and all such conditions and combinations are within the scope of the present disclosure.

The above disclosure is meant to be illustrative of the principles and various embodiment of the present invention. Numerous variations and modifications will become apparent to those skilled in the art once the above disclosure is fully appreciated. It is intended that the following claims be interpreted to embrace all variations and modifications.

We claim:

1. An apparatus, comprising a direct current ("DC") to DC converter comprising a first compensation logic and other DC to DC converter logic, the first compensation logic compensating for phase shifts in an output of the DC to DC converter, the first compensation logic disabled and enabled independently of the other DC to DC converter logic based on a first communication sent to the DC to DC converter, wherein the first communication is received by the DC to DC converter from a computer and the first communication is to select an output voltage of the DC to DC converter.

2. The apparatus of claim 1, wherein the DC to DC converter further comprises a second compensation logic, the second compensation logic disabled and enabled independently of the first compensation logic and the other DC to DC converter logic based on a second communication sent to the DC to DC converter.

3. The apparatus of claim 1, wherein the DC to DC converter further comprises a switch decoupling the first compensation logic from the other DC to DC converter logic based on the first communication.

4. The apparatus of claim 1, wherein an integrated circuit comprises the first compensation logic and the other DC to DC converter logic.

5. The apparatus of claim 1,
wherein the DC to DC converter converts a first DC voltage to a second DC voltage based on the first compensation logic when the first compensation logic is enabled,
wherein the DC to DC converter converts the first DC voltage to a third DC voltage based on the first compensation logic when the first compensation logic is disabled, and
wherein none of the first DC voltage, the second DC voltage, or the third DC voltage is identical to each other.

6. The apparatus of claim 1, wherein the other DC to DC converter logic comprises an error amplifier, a pulse width modulator, and a driver.

7. The apparatus of claim 1, wherein the first compensation logic comprises a resistor and a capacitor.

8. The apparatus of claim 1, wherein the first communication is a binary signal.

9. The apparatus of claim 2, wherein the first communication is sent over a first channel, and wherein the second communication is sent over a second channel.

10. The apparatus of claim 1, wherein the DC to DC converter further comprises a second compensation logic, the second compensation logic disabled and enabled concurrently with the other DC to DC converter logic.

11. A system, comprising a DC to DC converter coupled to a computer, the DC to DC converter comprising a first compensation logic, a second compensation logic, and other DC to DC converter logic, the first compensation logic and the second compensation logic compensating for phase shifts in an output of the DC to DC converter, the first compensation logic disabled and enabled independently of the second compensation logic and the other DC to DC converter logic based on a first communication sent to the DC to DC converter, the second compensation logic disabled and enabled independently of the first compensation logic and the other DC to DC converter logic based on a second communication sent to the DC to DC converter, wherein the first and second communications are received b the DC to DC converter from a computer and the communications are to select an output voltage of the DC to DC converter.

12. The system of claim 11, wherein the DC to DC converter further comprises a first switch decoupling the first compensation logic from the other DC to DC converter logic based on the first communication, and wherein the DC to DC converter further comprises a second switch decoupling the second compensation logic from the other DC to DC converter logic based on the second communication.

13. The system of claim 11, wherein an integrated circuit comprises the first compensation logic, the second compensation logic, and the other DC to DC converter logic.

14. The system of claim 11,
wherein the DC to DC converter converts the first DC voltage to the second DC voltage based on the first compensation logic, when the first compensation logic is enabled, and based on the second compensation logic, when the second compensation logic is enabled,
wherein the DC to DC converter converts the first DC voltage to a third DC voltage based on the first compensation logic, when the first compensation logic is enabled, and based on the second compensation logic, when the second compensation logic is disabled,
wherein the DC to DC converter converts the first DC voltage to a fourth DC voltage based on the first compensation logic, when the first compensation logic is disabled, and based on the second compensation logic, when the second compensation logic is enabled,
wherein the DC to DC converter converts the first DC voltage to a fifth DC voltage based on the first compensation logic, when the first compensation logic is disabled, and based on the second compensation logic, when the second compensation logic is disabled, and
wherein none of the first DC voltage, the second DC voltage, the third DC voltage, the fourth DC voltage, or the fifth DC voltage is identical to each other.

15. The system of claim 11, wherein the other DC to DC converter logic comprises an error amplifier, a pulse width modulator, and a driver.

16. The system of claim 11, wherein the computer sends the first communication and the second communication to the DC to DC converter.

17. The system of claim 11, wherein the first communication is sent over a first channel, and wherein the second communication is sent over a second channel.

18. A direct current ("DC") to DC converter, comprising:
a plurality of independently addressable compensation logic components connected in parallel and connected in a feedback loop with an error amplifier to change an output voltage of the DC to DC converter, wherein each of the plurality of compensation logic components comprises a resistor and a capacitor connected in series and wherein each of the plurality of independently addressable compensation logic components is independently enabled and disabled based on a communication received from a computer.

19. The DC to DC converter of claim 18, further comprising:
a plurality of feed forward circuits, each of the plurality of feed forward circuits, except for a base feed forward circuit, comprises a resistor and a capacitor connected in series, the base feed forward circuit comprising a resistor, wherein the feed forward circuits receive the output voltage as an input, wherein the combination of the error amplifier, the plurality of compensation logics and the plurality of feed forward circuits to compare the output voltage to a reference voltage which is input to an input of the error amplifier.

20. The DC to DC converter of claim 18, wherein enabling different combinations of the plurality of compensation logics causes the DC to DC converter to output a different voltage.

* * * * *

UNITED STATES PATENT AND TRADEMARK OFFICE
CERTIFICATE OF CORRECTION

PATENT NO. : 8,564,266 B2
APPLICATION NO. : 12/994101
DATED : October 22, 2013
INVENTOR(S) : Kelly Jean Pracht et al.

Page 1 of 1

It is certified that error appears in the above-identified patent and that said Letters Patent is hereby corrected as shown below:

In the Claims:

In column 6, line 55, in Claim 11, delete "b" and insert -- by --, therefor.

Signed and Sealed this
Eleventh Day of February, 2014

Michelle K. Lee
*Deputy Director of the United States Patent and Trademark Office*